United States Patent [19]

Schwandt

[11] Patent Number: 5,063,679
[45] Date of Patent: Nov. 12, 1991

[54] PROTRACTOR BUBBLE LEVEL

[76] Inventor: Bruce E. Schwandt, 33871 El Encanto Ave., Dana Point, Calif. 92729

[21] Appl. No.: 595,303

[22] Filed: Oct. 10, 1990

[51] Int. Cl.$^5$ ............................................. G01C 9/28
[52] U.S. Cl. ...................................... 33/347; 33/370; 33/371; 33/373; 33/384; 33/388
[58] Field of Search ................. 33/334, 347, 370, 371, 33/372, 373, 384, 385, 386, 387, 388

[56] References Cited

U.S. PATENT DOCUMENTS

| | | | |
|---|---|---|---|
| 199,319 | 1/1878 | Schnell | 33/387 |
| 306,429 | 10/1884 | Rich | 33/387 |
| 657,443 | 9/1900 | Newton | 33/384 |
| 2,541,641 | 2/1951 | Dooson | 33/385 |
| 2,541,880 | 2/1951 | McMillan et al. | 33/347 |
| 2,692,440 | 10/1954 | Walters | 33/214 |
| 2,694,301 | 11/1954 | Boyer | 66/86 |
| 2,757,458 | 8/1956 | Zipser | 33/373 |
| 2,968,873 | 1/1961 | Holderer | 33/371 |
| 3,664,032 | 5/1972 | Tompkins | 33/334 |
| 3,807,051 | 4/1974 | Funakubo | 33/334 |
| 4,125,944 | 11/1978 | Esposito et al. | 33/334 |
| 4,208,802 | 6/1980 | Berndt | 33/371 |
| 4,457,078 | 7/1984 | Suchy | 33/334 |
| 4,580,350 | 4/1986 | Fincher | 33/347 |
| 4,604,812 | 8/1986 | Arjomand | 33/387 |
| 4,663,856 | 5/1987 | Hall et al. | 33/373 |

FOREIGN PATENT DOCUMENTS

| | | | |
|---|---|---|---|
| 585376 | 10/1959 | Canada | 33/347 |
| 319322 | 7/1919 | Fed. Rep. of Germany | 33/370 |
| 865697 | 2/1953 | Fed. Rep. of Germany | 33/373 |
| 960807 | 4/1950 | France | 33/387 |

Primary Examiner—Thomas B. Will
Attorney, Agent, or Firm—Stetina and Brunda

[57] ABSTRACT

The present invention relates to an improved leveling device for use with various tools or other objects during a construction or repair process. A bubble level is mounted along the straight edge of a semi-circular protractor. The protractor is movably connected to a base member and adapted to pivot thereon relative to a central axis extending through the base member. A detent mechanism is provided within the base member for maintaining the protractor at various angular settings. The base member is also adapted to rotate about the central axis and may be easily and quickly attached to or removed from the protractor bubble level as well as various types of work surfaces including wood and metal.

12 Claims, 2 Drawing Sheets

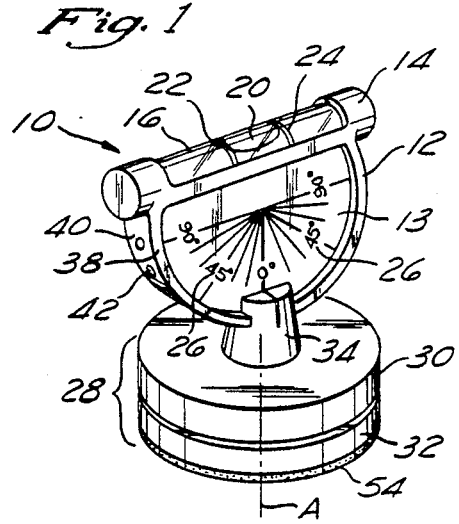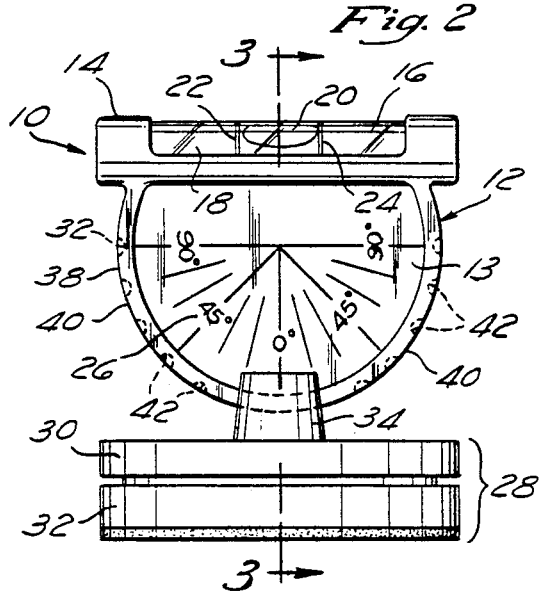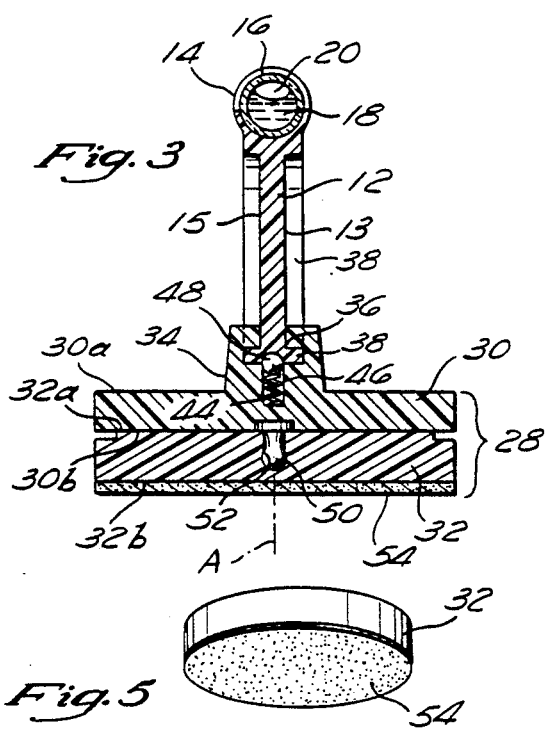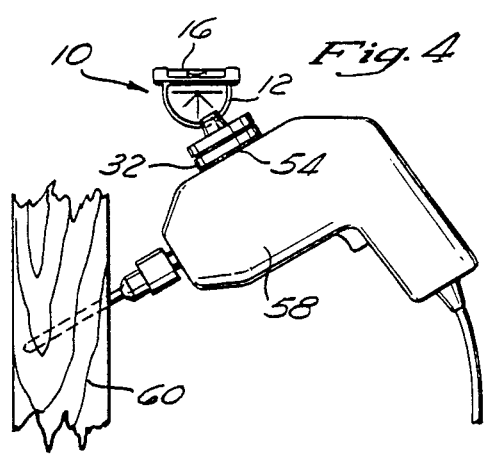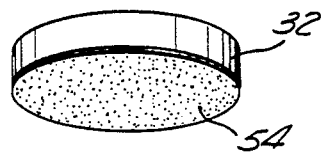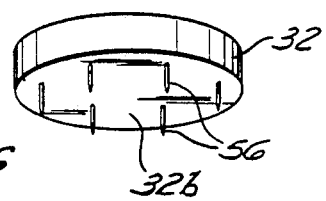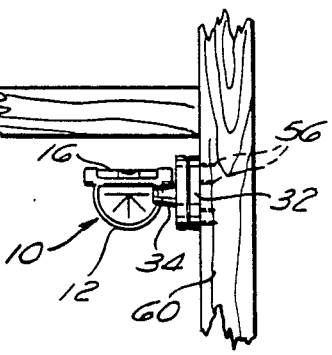

PROTRACTOR BUBBLE LEVEL

FIELD OF THE INVENTION

The present invention relates generally to measuring devices, and more particularly to a leveling device adapted for rapid affixation to and removal from a stud, power tool or the like for purposes of allowing precise angular orientation and directional control thereof.

BACKGROUND OF THE INVENTION

Currently, many measuring devices are known which use the combination of a leveling mechanism and an angular protractor for purposes of setting particular tools or structural members at a desired angle during construction or repair operations. Such measuring devices as currently known however, possess certain inherent deficiencies which detract from their overall utility. Foremost of these deficiencies is the total unsuitability of these measuring devices for rapid attachment to or removal from those tools or structural members with which the device is to be utilized for leveling purposes. Additionally, many such devices are adapted to be used only with tools or structural members having particular outer surface configurations and/or which are constructed from particular materials (i.e. wood, metal, etc.). Another deficiency of these devices relates to the complexity of their construction and method of operation. In this respect, often times an individual must possess special skills or be given special instruction to properly utilize the device. Thus, in many instances individuals are discouraged from using such devices due to the time, complexity and difficulty typically associated with their use.

Thus, there exists a substantial need in the art for a leveling device which may be used for obtaining precise angular orientation and directional control of various tools or other objects typically used in construction or repair operations, wherein the leveling device is suitable for rapid attachment to or removal from the object with which it is used and is relatively simple to operate.

SUMMARY OF THE INVENTION

The present invention overcomes difficulties associated with prior art measuring devices. In accordance with the preferred embodiment of the present invention, there is provided an adjustable protractor bubble level generally comprising a circular and/or semi-circular protractor which defines a straight edge and has angular graduations thereon. An elongate bubble level is rigidly mounted to the protractor wherein the bubble level extends longitudinally along the straight edge of the protractor. A generally circular base member is also provided which defines a central axis extending therethrough. Advantageously, the protractor is movably mounted to the base member such that the protractor and the bubble level may be pivoted relative to the central axis of the base member.

In the preferred embodiment of the present invention, the base member comprises a protractor securing portion and an interchangeable mounting portion which defines a generally planar lower surface. The lower surface of the mounting portion includes any one of a number of securing instrumentalities, each of which are adapted to affix the mounting portion to a particular type of work surface, thereby allowing the leveling device to be used in conjunction with a wide variety of work surfaces irrespective of the outer surface configuration or material composition thereof. Typically, these surfaces include structural members such as studs which are constructed from wood or metal and devices such as conventional power tools, and more particularly drills. In this regard, for securing the leveling device to a wooden stud or other soft work surface, the mounting portion will include plural spikes or nails which extend downwardly from the lower surface thereof. For metal work surfaces, a magnet will be disposed adjacent the lower surface of the mounting portion. The lower surface of the mounting portion may also include a strap member disposed adjacent thereto wherein the strap member may be used to affix the leveling device to a drill or similar tool having an irregular outer surface configuration. In the preferred embodiment, the mounting portion is rotatably attached to the securing portion such that the securing portion may rotate about the central axis extending through the base member. The rotatable attachment is facilitated by a snap connector which extends from the securing portion and is received into a recess disposed within the mounting portion. The snap connector, in addition to enabling the protractor securing portion to be rotated relative to the mounting portion, also provides for the interchangeability of the mounting portion by allowing it to be easily removed from or connected to the securing portion.

The leveling device of the present invention further incorporates a detent mechanism for maintaining the protractor/level at a particular angle relative to the securing portion of the base member to which it is attached. In this regard, the detent mechanism comprises a ball bearing and spring assembly disposed within the securing portion of the base member. The ball bearing is sized and configured to be slidably received into any one of a plurality of detents are disposed about the semicircular periphery of the protractor. In the preferred embodiment, each detent is disposed about the periphery of the protractor in a location corresponding to a particular angular measurement, thereby allowing the leveling device to be set and maintained at commonly used angles. However, alternative indexing and detent mechanisms are expressly contemplated herein.

It is an object of the present invention to provide a leveling device which is operable to position various objects at desired angular orientations.

Another object of the present invention is to provide a leveling device which is suitable for rapid attachment to or removal from the object with which it is utilized during a leveling operation.

Another object of the present invention is to provide a leveling device which may be affixed to work surfaces having any one of a plurality of outer surface configurations.

A further object of the present invention is to provide a leveling device which may be affixed to hard or soft, ferrous or non-ferrous, and/or rough and smooth work surfaces.

A further object of the present invention is to provide a leveling device which is simply constructed and easy to use.

Further objects and advantages of the invention will become apparent to those skilled in the art upon reading and consideration of the following description of a preferred embodiment and the accompanying drawings.

BRIEF DESCRIPTION OF THE DRAWINGS

These as well as other features of the present invention will become apparent upon reference to the drawings wherein:

FIG. 1 is a perspective view of the leveling device of the present invention;

FIG. 2 is a front elevational view of the leveling device;

FIG. 3 is a cross-sectional view of the leveling device taken along line 3—3 of FIG. 2;

FIG. 4 is a side view of the leveling device illustrating the utilization of the device with a conventional power drill;

FIGS. 5 and 6 are perspective view illustrating various embodiments of the mounting portion of the leveling device;

FIG. 7 is a side view of the leveling device illustrating the utilization of the device with a soft work surface comprising a stud;

DETAILED DESCRIPTION OF THE PREFERRED EMBODIMENT

Figure 8:
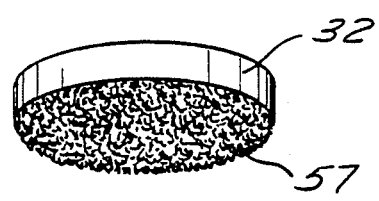
FIGS. 8-11 are perspective views illustrating further embodiments of the mounting portion of the leveling device.

Referring now to the drawings wherein the showings are for purposes of illustrating a preferred embodiment of the present invention and not for purposes of limiting the same, FIG. 1 perspectively illustrates the leveling device 10 of the present invention. As best seen in FIGS. 1 and 2, leveling device 10 generally comprises a semi-circular protractor portion 12 having an elongate bubble level 14 rigidly mounted to and extending longitudinally along the straight edge thereof. Although in the preferred embodiment, the portion 12 is formed having a semi-circular configuration, those skilled in the art will recognize that the portion 12 may additionally be formed in a circular configuration without departing from the teachings of the present invention. Bubble level 14 includes a transparent, generally cylindrical chamber 16 in which is contained a quantity of fluid 18 and an air bubble 20. Disposed about the outer surface of transparent chamber 16 are parallel markings 22, 24 which are separated by a distance corresponding to the approximate length of air bubble 20. As can be appreciated, markings 22, 24 are used to indicate when bubble level 14 has obtained a horizontal orientation. The planar faces 13, 15 of protractor portion 12 include angular graduations 26 which are inscribed thereon in a manner consistent with conventionally known and manufactured protractors. Protractor portion 12 further includes a flange 38 formed about the semi-circular periphery thereof. Flange 38 which extends at right angles from planar faces 13, 15 of protractor portion 12 is included for reasons which will be explained in greater detail below.

Protractor portion 12 of leveling device 10 is movably mounted to a base member 28 which defines a central axis A extending therethrough. Advantageously, protractor portion 12 is mounted to base member 28 in a manner whereby protractor portion 12 may be pivoted relative to central axis A. Referring now to FIG. 3, base member 28 generally comprises a protractor securing portion 30 and a mounting portion 32. In the preferred embodiment, both securing portion 30 and mounting portion 32 have generally circular configurations. Extending upwardly from top surface 30a of securing portion 30 is a securing member 34. A generally T-shaped slot 36 is formed within securing member 34 and extends horizontally therethrough. T-shaped slot 36 is sized and configured to receive flange 38 of protractor portion 12 thereby facilitating the attachment of protractor portion 12 to base member 28. Importantly, the interface of flange 38 to T-shaped slot 36 is adapted to allow the sliding movement of flange 38 within slot 36, thus providing the pivoting capacity of protractor portion 12 relative to central axis A.

Figure 12:
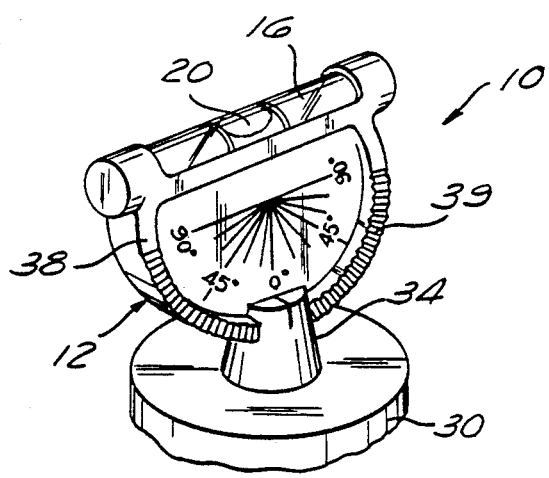
FIG. 12 is a perspective view of an alternative embodiment of the leveling device of the present invention.

In the preferred embodiment, flange 38 defines an outer surface 40 into which is formed a plurality of linearly aligned detents 42. Advantageously, detents 42 are formed within outer surface 40 at locations corresponding to specific angular graduations inscribed on planar faces 13, 15 of protractor portion 12. Disposed within T-shaped slot 36 is a downwardly extending aperture 44 which is in approximate axial alignment with central axis A and includes a coil spring 46 extending axially therein. The length of spring 46 is such that spring 46 does not extend beyond the top of aperture 44. A ball bearing 48 which is sized to be receivable within any of detents 42 is positioned on top of spring 46 and is thus disposed adjacent the open end of aperture 44. The position of ball bearing 48 is such that central axis A will extend approximately through the center thereof. As will be appreciated, the receipt of ball bearing 48 into any of detents 42 as flange 38 moves through slot 36 will be operable to maintain protractor portion 12 at a specific angular orientation relative to central axis A. In this respect, the upward biasing force exerted on ball bearing 48 by spring 46 is operable to maintain ball bearing 48 within any of detents 42. When the angular orientation of protractor portion 12 is to be altered, a rotational force applied to protractor portion 12 will cause ball bearing 48 to be downwardly compressed against spring 46 thereby allowing flange 38 to be moved through slot 36 until another of detents 42 is encountered. It will be appreciated that other methods may be utilized to maintain protractor portion 12 at a specific angular orientation relative to base member 28 and that the aforementioned technique is intended to encompass only one possible method. For instance, the exterior edge or edges of the flange 38 may be provided with radially extending serrated grooves 39 which mate with complementary formed grooves positioned upon the interior surfaces of member 34, as seen in FIG. 12. Additionally, various types of detent mechanisms may be provided between members 32 and 30 to allow an indexing of the relative rotational positions between the same. Further, similar graduations may be provided on the periphery of the members 30 and 32 to provide a visual observation of the relative rotational positions of the members 30 and 32.

In the preferred embodiment of the present invention, mounting portion 32 is rotatably attached to protractor securing portion 30. The rotatable attachment is facilitated by a snap connector 50. Snap connector 50 is mounted within securing portion 30 in a manner wherein snap connector 50 extends downwardly from lower surface 30b thereof. Mounting portion 32 includes a recess 52 disposed within upper surface 32a thereof which is sized and configured to receive snap connector 50. When snap connector 50 is received within recess 52, upper surface 32a of mounting portion 32 is directly abutted against lower surface 30b of securing portion 30. Though abutted, the interface between securing portion 30 and mounting portion 32 is adapted to allow upper surface 32a and lower surface 30b to maintain a sliding contact when securing portion 30 is rotated. Importantly, both snap connector 50 and recess 52 are positioned such that central axis A extends approximately through the centers thereof. Thus, when secured to securing member 34, protractor portion 12 is rotatable about central axis A in addition to being pivotal with respect thereto. It should be noted, that the use of snap connector 50, in addition to enabling securing portion 30 to be rotated, also allows mounting portion 32 to be quickly and easily removed and replaced. It will be appreciated that other methods may be used to obtain the rotatable connection between securing portion 30 and mounting portion 32, and that the aforementioned technique is intended to encompass only one possible method.

Figure 9:
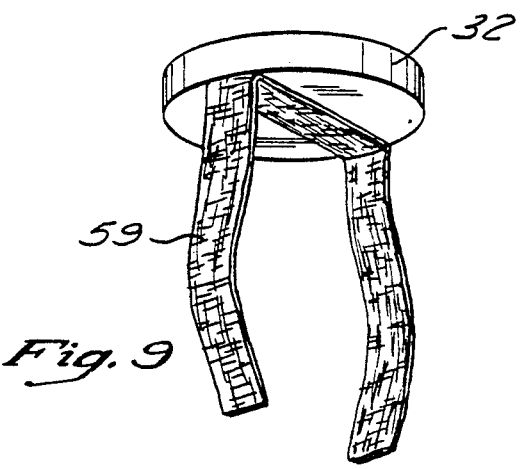
Figure 10:
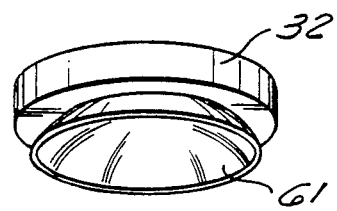
Figure 11:
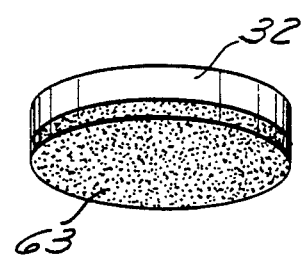

The lower surface 32b of mounting portion 32 includes any one of a number of securing instrumentalities, each of which are adapted to affix mounting portion 32 to a particular type of work surface. Thus, due to the interchangeable capacity of mounting portion 32, leveling device 10 may be used in conjunction with a wide variety of work surfaces irrespective of the outer surface configuration or material composition thereof. In this regard, FIGS. 3 and 5 illustrate a magnet 54 attached to lower surface 32b of mounting portion 32 to facilitate attachment to a surface having metallic properties. Additionally, as seen in FIG. 6, spikes 56 which extend downwardly from lower surface 32b may be utilized to affix mounting portion 32 to soft work surfaces such as wood. Additionally, other affixation means such as hook and loop fastener 57 as seen in FIG. 8, strap member 59 as seen in FIG. 9, suction cup 61 as seen in FIG. 10, and adhesive 63 as seen in FIG. 11 are contemplated herein.

Referring now to FIG. 4, illustrated is one method of utilizing leveling device 10. In this regard, leveling device 10 is attached to the outer surface of a power drill 58. In this particular application, magnet 54 is used to affix leveling device 10 to drill 58 due to the metallic composition of the housing of drill 58. After leveling device 10 is affixed to drill 58, protractor portion 12 may be indexed relative to base member 28 in the manner previously described to set protractor portion 12 at a particular angle. Drill 58 may then be manually moved until such time as bubble level 14 indicates that the desired orientation has been obtained.

Referring now to FIG. 7, illustrated is a second method of utilizing leveling device 10 wherein leveling device 10 is affixed to a wooden stud 60 through the utilization of the spiked mounting portion configuration as shown in FIG. 6. In this particular application, leveling device 10 is affixed to stud 60 and set at a particular angle. Subsequently, stud 60 may be manually moved until such time as the bubble level 14 indicates that the desired orientation has been obtained. With respect to the utilization of leveling device 10 as illustrated in FIG. 4, it should be noted that as an alternative to the use of magnet 54, a strap (not shown) may be utilized in conjunction with mounting portion 32 to affix leveling device 10 to drill 58 or similar tools. Advantageously, the use of mounting portion 32 irrespective of the particular securing instrumentability associated therewith has the advantage of allowing leveling device 10 to be placed on or removed from a tool or other object quickly and easily.

Additional modifications and improvements of the present invention may also be apparent to those skilled in the art. Thus, the particular combination of parts described and illustrated herein is intended to represent only one embodiment of the invention, and is not intended to serve as limitations of alternative devices within the spirit and scope of the invention.

What is claimed is:

1. An adjustable protractor bubble level comprising:
   a protractor portion having angular graduations thereon;
   an elongate bubble level rigidly mounted to said protractor portion.
   a base member defining a central axis extending therethrough, said base member comprising:
   (a) a protractor securing portion, said protractor portion being pivotally mounted to said securing portion;
   (b) a mounting portion having a generally planar lower surface; and
   (c) a snap connector for rotatably and releasably attaching said mounting portion to said securing portion in a manner wherein said securing portion is rotatable about said central axis;
   means for affixing said lower surface of said mounting portion to a work surface.

2. The device of claim 1 wherein said affixing means comprises plural spikes extending downwardly from said lower surface of said mounting portion.

3. The device of claim 1 wherein said affixing means comprises a magnet disposed adjacent said lower surface of said mounting portion.

4. The device of claim 1 wherein said affixing means comprises a strap member disposed adjacent said lower surface of said mounting portion.

5. The device of claim 1 wherein said affixing means comprises a hook and loop fastener disposed upon said lower surface of said mounting portion.

6. The device of claim 1 wherein said affixing means comprises adhesive disposed upon said lower surface of said mounting portion.

7. The device of claim 1 wherein said affixing means comprises a suction cup disposed upon said lower surface of said mounting portion.

8. The device of claim 1 further including means for maintaining said protractor portion at a particular angle relative to said securing portion.

9. The device of claim 8 wherein said maintaining means comprises:
   a spring having a first end and a second end disposed within said securing portion;
   a ball bearing positioned adjacent said first end of said spring; and
   a plurality of detents disposed about the periphery of said protractor portion, said detents being sized and configured to receive said ball bearing.

10. The device of claim 8 wherein said maintaining means comprises:
    a plurality of radially extending serrated grooves disposed about the periphery of said protractor portion; and
    a plurality of grooves disposed upon interior surfaces of said securing portion, said grooves being sized and configured to be complimentary to and mate with said serrated grooves of said protractor portion.

11. The device of claim 1 wherein said base member has a generally circular configuration.

12. The device of claim 1 wherein said protractor portion has a semi-circular configuration defining a straight edge, said elongate bubble level being rigidly mounted to said protractor portion in a manner wherein said bubble level extends longitudinally along said straight edge.

* * * * *